United States Patent
Price et al.

(10) Patent No.: US 10,866,425 B1
(45) Date of Patent: Dec. 15, 2020

(54) IMAGE REPROJECTION BASED ON INTRA-PUPIL DISTANCE

(71) Applicant: Microsoft Technology Licensing, LLC, Redmond, WA (US)

(72) Inventors: Raymond Kirk Price, Redmond, WA (US); Michael Bleyer, Seattle, WA (US); Christopher Douglas Edmonds, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/716,380

(22) Filed: Dec. 16, 2019

(51) Int. Cl.
*H04N 13/332* (2018.01)
*G02B 27/01* (2006.01)
*G02B 27/00* (2006.01)
*G06T 19/00* (2011.01)

(52) U.S. Cl.
CPC ..... *G02B 27/0172* (2013.01); *G02B 27/0081* (2013.01); *G06T 19/006* (2013.01); *G02B 2027/014* (2013.01); *G02B 2027/0134* (2013.01); *G02B 2027/0138* (2013.01)

(58) Field of Classification Search
CPC .......... G06F 3/011–015; H04N 13/332; H04N 13/341; H04N 2201/3245; G06T 19/00
See application file for complete search history.

(56) References Cited

U.S. PATENT DOCUMENTS

| | | | |
|---|---|---|---|
| 8,638,498 B2 | 1/2014 | Bohn et al. | |
| 10,437,065 B2 | 10/2019 | Zhu et al. | |
| 2013/0050642 A1 | 2/2013 | Lewis et al. | |
| 2014/0274391 A1 | 9/2014 | Stafford | |
| 2016/0131902 A1 | 5/2016 | Ambrus et al. | |
| 2017/0289518 A1 | 10/2017 | Kim et al. | |
| 2019/0208187 A1 | 7/2019 | Danziger | |
| 2019/0260981 A1* | 8/2019 | Ollila | H04N 13/25 |
| 2020/0042081 A1* | 2/2020 | Miller | G06T 7/70 |
| 2020/0186787 A1* | 6/2020 | Cantero Clares | H04N 13/344 |

FOREIGN PATENT DOCUMENTS

WO 2019037578 A1 2/2019

OTHER PUBLICATIONS

"VIVE", Retrieved from: https://web.archive.org/web/20190525200503/https://www.vive.com/eu/support/vive-pro-hmd/category_howto/adjusting-the-ipd-on-the-headset.html, May 25, 2019, 2 Pages.

* cited by examiner

*Primary Examiner* — Sanghyuk Park
(74) *Attorney, Agent, or Firm* — Alleman Hall Creasman & Tuttle LLP

(57) ABSTRACT

A head-mounted display comprises a stereo pair of outward-facing cameras that are separated by a baseline distance when the head-mounted display is being worn by the user, and a controller. The controller is configured to receive an inter-pupil distance (IPD) of the user and to compare the IPD to the baseline distance of the stereo pair of outward-facing cameras. Image data of an environment is received from the stereo pair of outward-facing cameras. If the difference between the IPD and the baseline distance is less than a first threshold, the image data is passed through to the head-mounted display without correcting for the IPD. If the difference between the IPD and the baseline distance is greater than the first threshold, the image data is reprojected based on the IPD prior to displaying the image data on the head-mounted display.

20 Claims, 11 Drawing Sheets

IMAGE REPROJECTION BASED ON INTRA-PUPIL DISTANCE

BACKGROUND

Head-mounted display devices may include see-through displays that enable augmented or mixed reality wherein virtual images are presented on the see-through display so as to appear alongside real-world objects visible through the display. Outward-facing cameras positioned on the head-mounted display enable the environment to be imaged, and for spatial information regarding the environment to be considered when generating and presenting virtual images.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A head-mounted display comprises a stereo pair of outward-facing cameras, designed to see in low-light, short-wave infrared, or longwave infrared wavelengths, separated by a baseline distance when the head-mounted display is being worn by the user, and a controller. The controller is configured to receive or measure an inter-pupil distance (IPD) of the user and to compare the IPD to the baseline distance of the stereo pair of outward-facing cameras. Image data of an environment is received from the stereo pair of outward-facing cameras. If the user's IPD is within a threshold of the baseline distance, the image data is passed through to the head-mounted display without correcting for the IPD. If the difference between the IPD and the baseline distance is greater than a first threshold, the image data is reprojected based on the IPD prior to displaying the image data on the head-mounted display.

DETAILED DESCRIPTION

Head-mounted displays may be used to present virtual reality or augmented reality to users. Such systems often incorporate outward-facing cameras to view and record the environment of the user. The resulting image data may then be displayed to the user, using near-eye displays, for example.

For augmented reality applications, it is desirable for the user to view their own environment while wearing the head-mounted display. Image data, be it virtual or derived from the outward-facing cameras, may be overlaid to augment the user's own vision. As an example, the outward-facing cameras may be low light, near infrared, far infrared (also known as thermal imagery), or otherwise capable of providing information that would be challenging for the user to view/perceive otherwise. The content of those cameras may then be rendered on to the display. This may allow the user to view objects such as buildings, people, etc. outside in a dark city environment. As another example, imagery could be presented that increases the display intensity of dark objects in a high dynamic range environment, allowing both bright and dark objects to be viewed. In applications where the head-mounted display includes a see-through display, recorded imagery may be overlaid onto real-world objects viewed by the user via the see-through display.

However, in order to provide this functionality for a see-through display, the outward-facing cameras are typically offset from the user's eyes. Thus, the outward-facing cameras are necessarily not telecentric to the user's eye. The perspective difference that is generated through such camera positioning provides an offset from the world imaged by the camera and real world, that may result in parallax and misalignment of objects from the user's perspective. In other words, the stereographic perspective of the outward-facing cameras is different to some degree from the stereographic perspective of the user's eyes.

Figure 1:
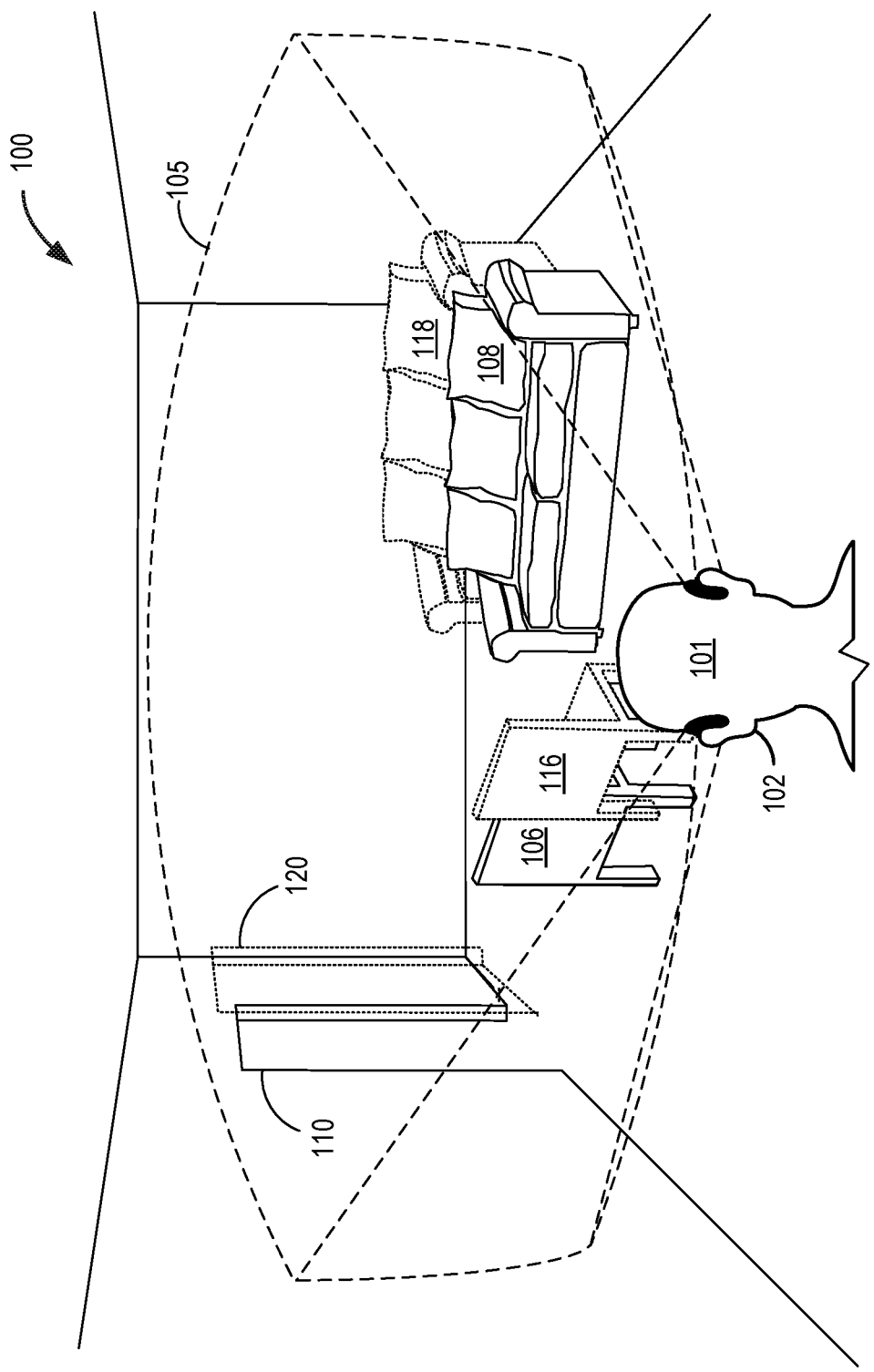
FIG. 1 shows an example wearable computing system within an environment.

As an example, FIG. 1 depicts an environment 100, wherein a user 101 is viewing the environment through computing device 102, which includes a head-mounted display. Device 102 includes a pair of stereo cameras and display including at least a pair of stereo near-eye displays. Other features of an example head-mounted display are discussed herein and with regard to FIG. 2.

User 101 views a portion of environment 100 via computing device 102, yielding a field of view (FOV) 105 that may be augmented via the near-eye displays. For example, image data of environment 100 taken by the pair of stereo cameras may be displayed on the near-eye displays. As such, user 101 may view real-world objects, such as chair 106, couch 108, and door 110, as well as the video representations of these objects, chair image 116, couch image 118, and door image 120.

If the real-world objects and their video representations are precisely overlaid, user 101 may be able to experience an enhanced version of environment 100. For example, user 101 may be able to make out object outlines in low light, be able to view both an object and its thermal profile, etc. However, if there is an incorrect separation or baseline distance between the cameras, such as the stereo cameras of computing device 102 not being telecentric with user 101's eyes, the video representations of the real-world object will be misaligned, and user 101 will have an incorrect depth perception of environment 100.

For example, proximal objects, such as chair 106, may be rendered to appear closer to the user than they actually are (e.g., chair image 116). Distal objects, such as couch 108 and door 110 may be rendered to appear further from the user than they actually are (e.g., couch image 118, door image 120). Further, as the cameras are not telecentric with the user's eyes, and are typically placed above or below the user's eyes, the objects in the scene as viewed from the camera perspective will be higher or lower than the view from the user's perspective.

It is possible to fully re-render image data before presenting the imagery to the user. For example, depth information from the stereo cameras or other depth imaging device may be used to generate floor planes, walls, etc. that may inform the distance of environmental objects. The image data may then be re-rendered and/or reprojected based on this depth information. However, this comes with a computing cost and a latency that may be unacceptable in some real-world applications. As such, user 101 may benefit from a device which features a low-latency pipeline to present a rendered image from the sensor to the display.

In this detailed description, example embodiments are described for systems and methods which enable accurate depth projection and alignment of acquired image data and real-world images for an environment at low-latency. A head-mounted display includes a stereo pair of outward-facing cameras. The cameras are spaced apart at a baseline distance equivalent to a mean interpupil distance (IPD) for a user population. In one example, if a user has an IPD within a threshold of the baseline distance, image data acquired by the outward-facing cameras is passed through to near-eye displays without reprojection. If the user has an IPD that falls outside the threshold, the image data is reprojected prior to display. In another example, if a user has an IPD within a threshold of the baseline distance, the image data is reprojected to a first fixed plane based on the mean IPD prior to being displayed. If the user has an IPD that falls outside the threshold, the image data is reprojected to an adjusted fixed plane based on the user's IPD prior to being displayed. In such examples, the stereo cameras may be movable to accommodate users having IPDs considerably different from the mean IPD.

Figure 2:
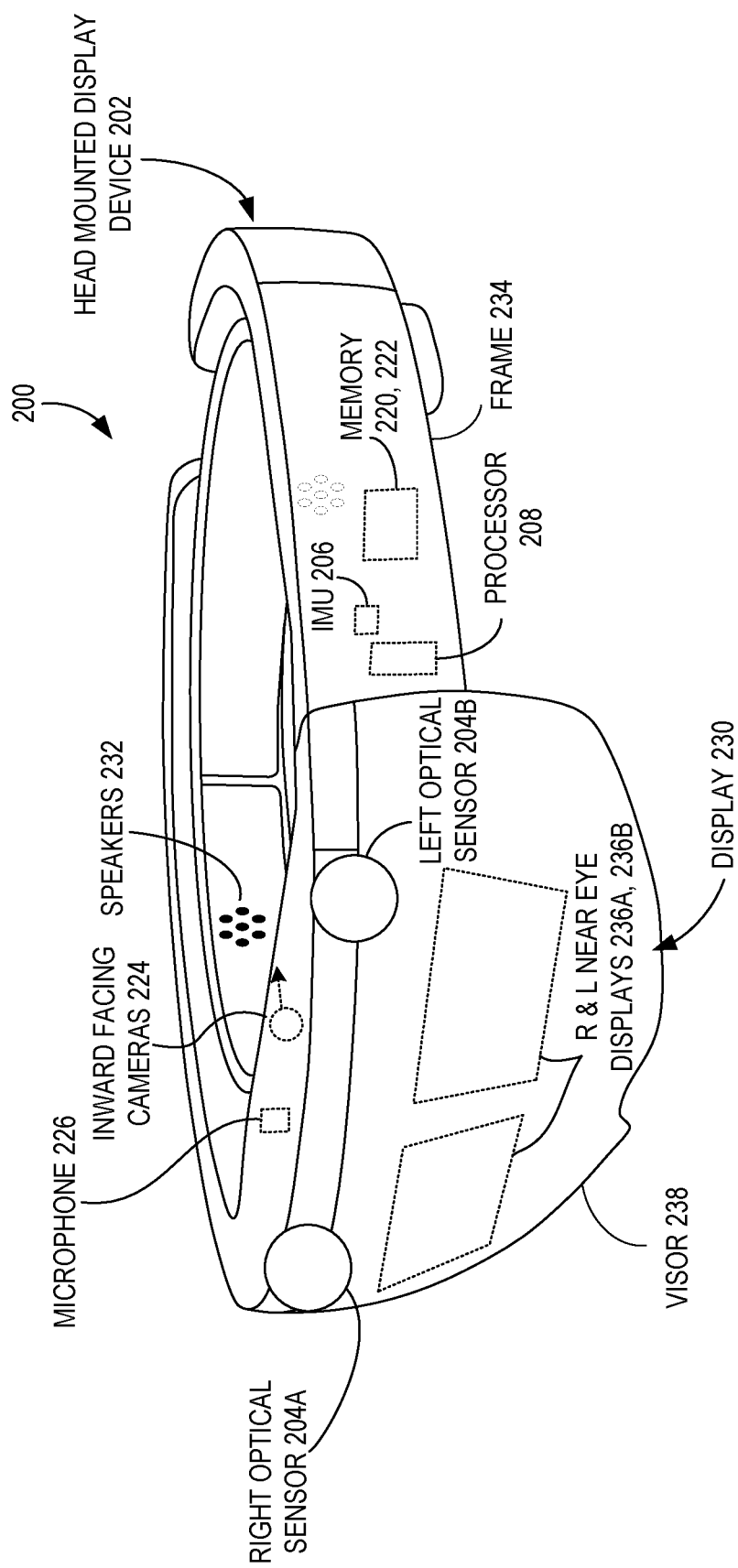
FIG. 2 is an example implementation of the computing system of FIG. 1.

FIG. 2 is an example implementation of the computing system 102 according to an example implementation of the present disclosure. In this example, as in FIG. 1, the computing system 200 is integrated into and/or implemented as an HMD device 202. In one example implementation, the computing system 200 may include a pair of optical sensors, such as the depicted right and left optical sensors 204A, 204B that may be a stereo pair of cameras on either side of HMD device 202 as shown in FIG. 2. Optical sensors 204A and 204B may be RGB cameras and/or low-light cameras such as IR cameras configured for night vision. In some examples, optical sensors 204A and 204B may include thermal cameras, such as those configured to receive and detect IR light in a range of 8,000 nm to 15,000 nm. It will be appreciated however that cameras included in the computing system 200 may be sensitive to various ranges of electromagnetic radiation as preferred by designers of the computing system 10, such as Ultra-Violet light or other suitable frequencies.

In some examples, a depth detection system (not shown) may also be included in the computing system 200 and integrated into the HMD device 202. The depth detection system may also include components such as a pair of stereo cameras and/or a pair of stereo low-level light cameras. Alternatively, the depth detection system may include a single camera and an inertial measurement unit (IMU) 206. Other depth detection systems may include a single camera and a light projector, a pair of cameras and a light projector, and/or a laser light source and a camera. For example, passive stereo methods of depth detection may only utilize a right and left camera, such as right and left optical sensors 204A and 20B. However, active stereo methods of depth detection may additionally process light projected by a projector that may be received at right and left cameras. A structured light method of depth detection may also be integrated into the computing system 200, in which case a projector and one camera to receive reflected projected light may be utilized. If a time-of-flight method of depth detection is preferred, the HMD device 202 may include a laser light source and corresponding sensor such as an IR laser in addition to a camera to receive reflected laser light. In another configuration, IMU 206 and a single camera may be used to detect depth.

The example computing system 200 includes a processor 208 and associated storage, which in FIG. 2 includes volatile memory 220 and non-volatile memory 222. The processor 208 is configured to execute instructions stored in the storage, using volatile memory 220 while executing instructions belonging to various programs and non-volatile memory 222 for storage of the programs. Other sensors that may be included in the computing system 200 as embodied in the HMD device 202 may be inward-facing cameras 224 to identify the position and orientation of each of a user's eyes and subsequently generate eye-tracking data. Also, a microphone 226 may receive natural language (NL) input from a user of the HMD device 202.

IMU 206 may be implemented in the HMD device 202 as described above, which may include accelerometers, gyroscopes, and/or a compass that can detect, for example, a 6 degree of freedom (6DOF) position and orientation of the HMD device 202. Processor 208 may further refine the 6DOF output of IMU 206 using visual tracking systems that search for movement of identified visual features in a series of images captured by the right and left optical sensors 204A and 204B and/or other cameras to generate an estimate of the relative movement of the HMD device 202 based upon the movement of these visual features within successive image frames captured by the optical sensors 204A and 204B over time. It will be appreciated that components such as the microphone 226 and/or one or more of the optical sensors 204A and 204B may be integrated with the HMD device 202, or provided separately therefrom. It will be further appreciated that other types of sensors not displayed in FIG. 2 may be included in the computing system 200.

Figure 9:
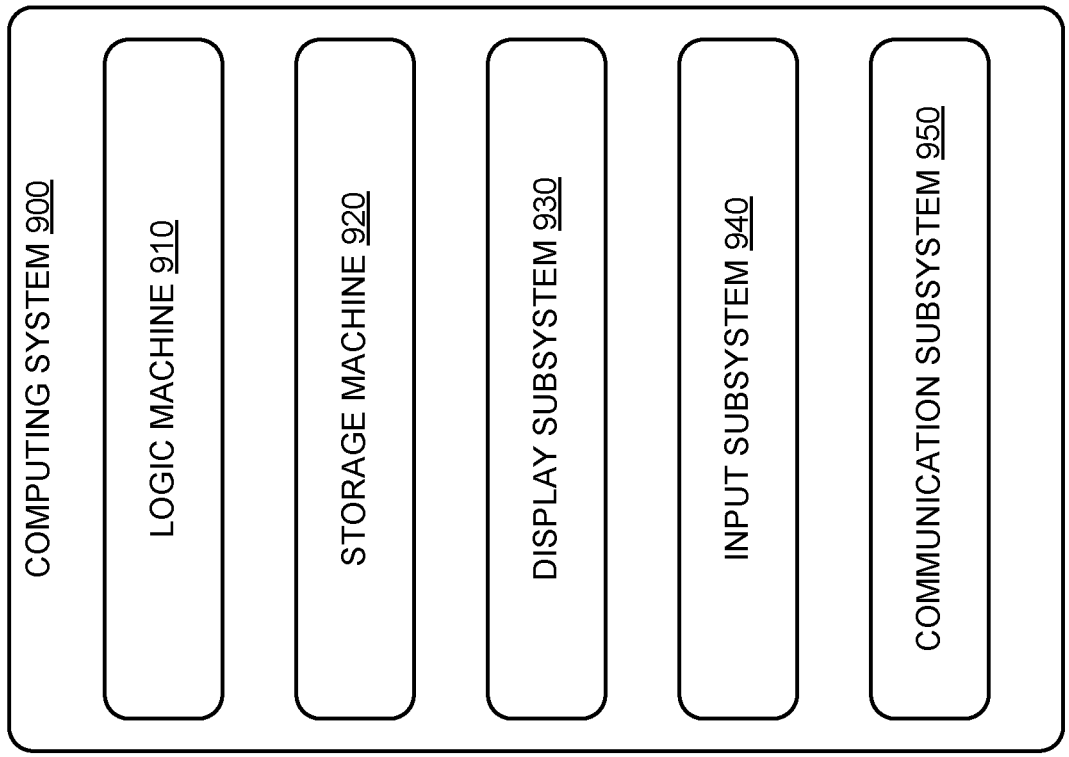
FIG. 9 is an example computing environment, which may be used to implement the computing system of FIG. 1.

A display 230 may be integrated with the HMD device 202, or optionally provided separately. Speakers 232 may also be included in the HMD device 202, or also provided separately. It will be appreciated that electronic and computing components may be connected via a bus. Furthermore, FIG. 9 depicts various computing system components that may correspond to the components of FIG. 2, and the descriptions of those components in FIG. 9 may therefore apply to such corresponding components in FIG. 2.

As shown in FIG. 2, the processor 208, volatile and non-volatile memories 220, 222, inward-facing cameras 224, optical sensors 204A and 204B, microphone 262, IMU 206, and speakers 232 may be incorporated within a housing of HMD device 202 as shown. HMD device 202 may include a mounting frame 234 that at least partially encircles the head of a user, and the display 230 may include a pair of right and left near-eye displays 236A and 236B. The near-eye displays 236A and 236B may be positioned behind a visor 238 through which a user may observe the physical surroundings in an augmented reality (AR) system. It will be appreciated that the near eye displays 236A and 236B and visor 238 may be at least partially transparent, enabling the user to see through these components to view the real environment, at least when content is not opaquely displayed on the near-eye displays 236A and 236B.

Figure 3:
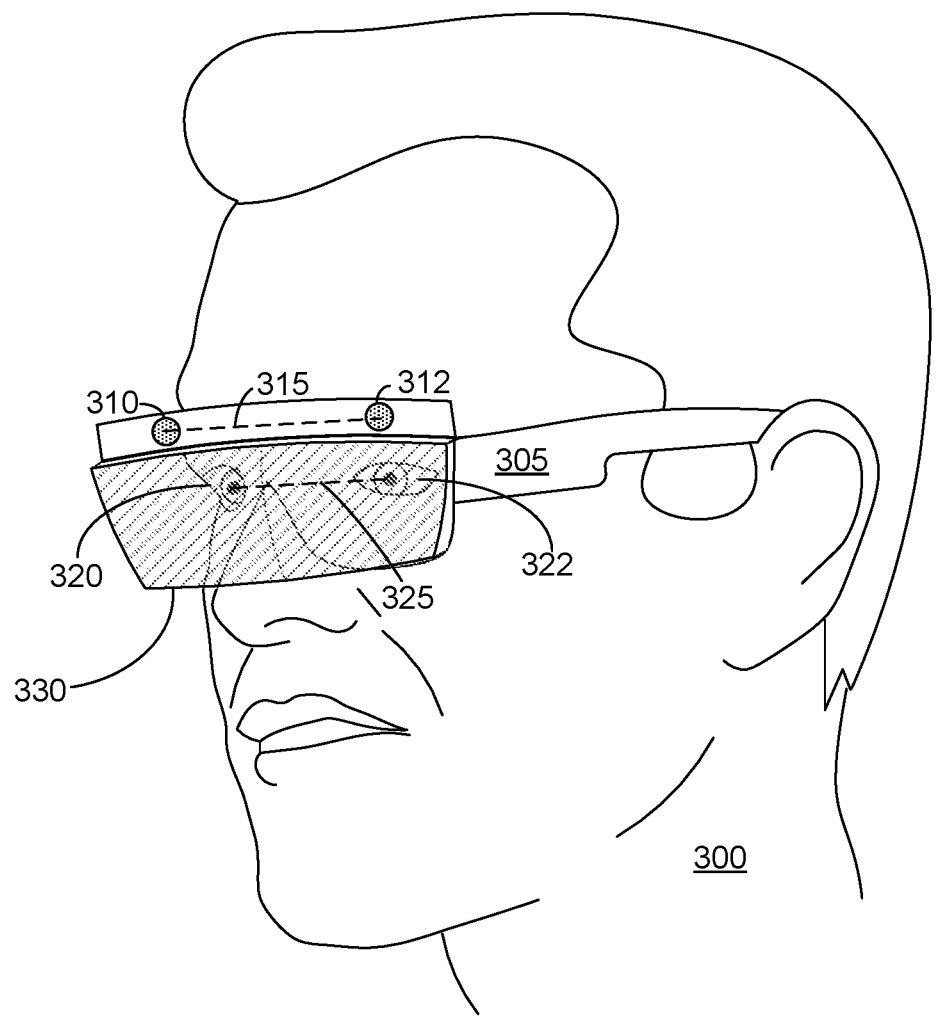
FIG. 3 shows positioning of stereo cameras on a head-mounted display relative to the eyes of a user.

FIG. 3 shows an example user 300 wearing a head-mounted display 305. Head-mounted display 305 may be an example of head-mounted display device 202. HMD 305 includes a pair of outward-facing cameras 310 and 312, separated by a baseline distance 315. User 300 has a pair of eyes including pupils 320 and 322 separated by an interpupil distance 325. Outward-facing cameras 310 and 312 are positioned above pupils 320 and 322 at a forehead of user 300. A display 330 may project data from cameras 310 and 312 to user 300.

Outward-facing cameras 310 and 312 are offset from pupils 320 and 322 in the X, Y, and Z dimensions, yielding multiple perception challenges that occur when the cameras and eyes are not telecentric, such as parallax and depth perception offset. As described herein, the user's eyes are spaced apart across the X dimension, the user's face stretches from chin to forehead along the Y dimension, and objects are placed in front or behind the user's eyes in the Z dimension. If the cameras 310 and 312 are raised 2 inches above pupils 320 and 322, there will be a 2-inch offset between the camera's perspective and the user's perspective. This is most notable for objects that are up close, but can be solved by applying a fixed offset to the image data. Similar corrections can be made in the Z dimension to correct for cameras 310 and 312 being set forward from pupils 320 and 322.

In the X dimension, this offset scales linearly. If baseline distance 315 were set at 70 mm and user 300 had an IPD 325 of 63 mm, there would be a roughly ~10% offset in depth perception if the image data were passed through directly to display 330. In some examples, it may be possible to mechanically adjust baseline distance 315 to match IPD 325 (discussed further herein with regard to FIGS. 5 and 7). However, in one-size fits all systems, the cameras may not be adjustable over a continuous spectrum, thus obliging at least some image correction for some users. As such, it may be advantageous to approach these depth perception problems for an HMD having a fixed baseline and/or a limited number of discreet baselines.

Figure 4:
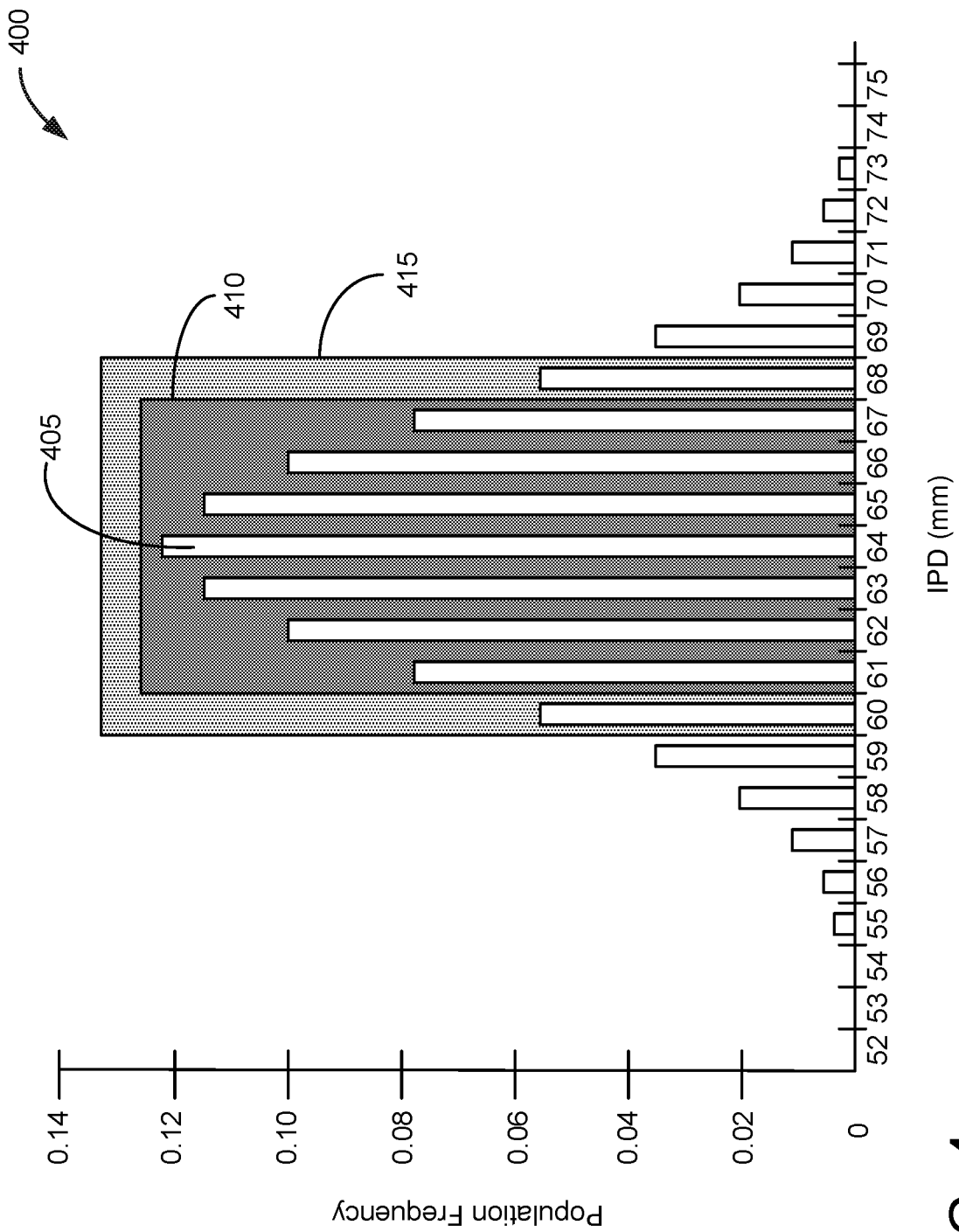
FIG. 4 shows an example plot of inter-pupil distance for a representative population.

FIG. 4 shows an example plot 400 indicating a distribution of IPD (in mm) for a particular user population (adult males). As shown at 405, this user population has a mean IPD of 64 mm. The user population has a normal distribution of IPD. As such, approximately 70% of the user population has an IPD within ±3 mm of 64 mm (410), and approximately 82% of the user population has an IPD within ±4 mm of 64 mm (415). As such, it may be advantageous to design the HMD with a baseline distance equal to the mean of the user population (e.g., 64 mm). This may provide a pleasing viewing experience for upwards of ~80% of users with minimal image processing. However, simply positioning the cameras in this way would still result in ~20% of users experiencing degraded stereo vision. Methods are thus provided herein that evaluate the IPD of the user against the baseline distance of the cameras and then select the lowest latency image processing that allows for accurate depth perception of objects within the user's environment.

Figure 5:
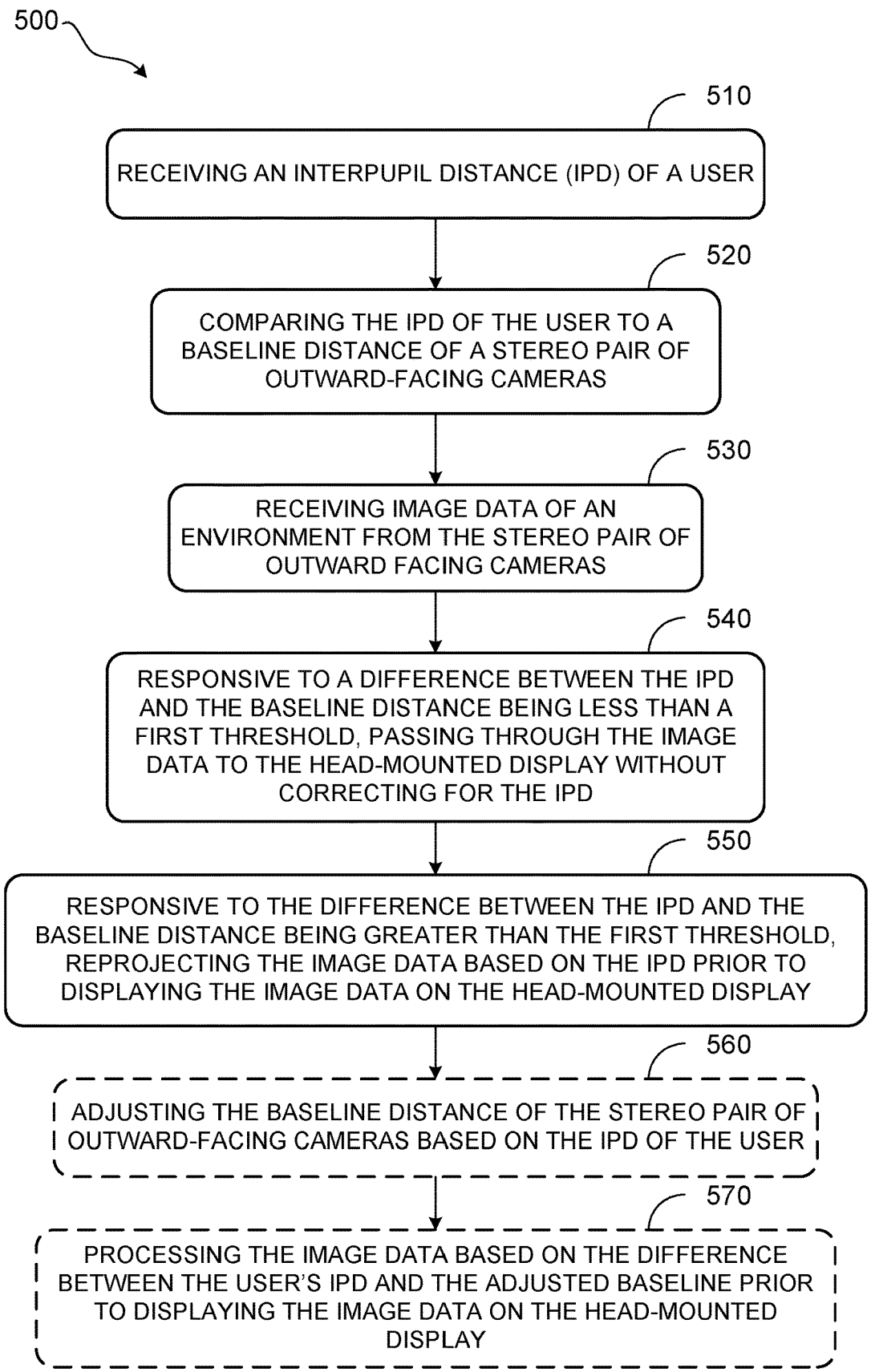
FIG. 5 shows an example method for presenting image data based on an inter-pupil distance of a user.

FIG. 5 shows a flow-chart for an example method 500 for presenting image data based on an inter-pupil distance of a user. Method 500 may be implemented by a computing system including a head-mounted display, such as computing system 200 described with regard to FIG. 2. Such a head-mounted display may include at least a stereo pair of outward-facing cameras separated by a baseline distance and positioned at a forehead or cheekbones of a user when the head-mounted display is being worn by the user. The head-mounted display may further include a controller configured to execute method 500.

Although method 500 will predominantly be described with regard to the user IPD distribution shown in FIG. 4 (e.g., mean IPD of 64 mm) any suitable IPD distribution and baseline distance between stereo cameras may be used without departing from this disclosure.

At 510, method 500 includes receiving an interpupil distance (IPD) of the user. Receiving an IPD of a user may occur passively, such as by accessing a database of user preferences. In some examples, the head-mounted display may prompt the user (e,g, provide visual stimulus and record response, provide various degrees of image correction and allow user to select a preferred setting) for input and determine the IPD based on the user input. In some examples, receiving an IPD of a user may include actively measuring a user's IPD using inward-facing, eye-tracking cameras. For example, the head-mounted display may include one or more inward-facing cameras, such as inward-facing cameras 224 shown in FIG. 2. Image data may be received from the one or more inward-facing cameras, and the IPD of the user determined based on the received image data.

For example, measuring the user's IPD may be performed by one or more of the following methods: direct observation of the eyes with an eye-facing camera, observation of glints from an LED array off the eye, mechanical estimation due to placement of the head-mounted display with respect to the user's head (e.g., a mechanical sensor that detects where the user places the head-mounted display and lens on his/her head), or through external measurement and direct entry by the user.

At 520, method 500 includes comparing the IPD to the baseline distance of the stereo pair of outward-facing cameras. For example, the baseline distance may be a fixed distance, and/or a distance determinable via the controller. In some examples, the baseline distance between the stereo pair of outward-facing cameras is based on a mean IPD determined from a user population. Comparing the IPD to the baseline distance may include determining a difference between the two distances, and may further include comparing the difference to one or more thresholds based on the baseline distance. The thresholds may further be based on the IPD distribution of the user population and/or one or more physiological factors.

At 530, method 500 includes receiving image data of an environment from the stereo pair of outward-facing cameras. For example, the stereo pair of outward-facing cameras may record left and right perspective views of the environment at a predetermined frame rate. As described with regard to FIG. 2, the stereo pair of outward-facing cameras may each include one or cameras configured to image the environment at a predetermined range of frequencies.

At 540, method 500 includes, responsive to a difference between the IPD and the baseline distance being less than a first threshold, passing through the image data to the head-mounted display without correcting for the IPD. In other words, if the user's IPD falls within a predetermined range of the baseline distance, the image data is passed through.

In the example distribution (e.g., plot 400) wherein the baseline distance is set at 64 mm and the population distribution is normal, the threshold may be set at ±3 mm or ±4 mm, so that there is simple stereo passthrough for roughly ~70% or ~82% of users as a default condition, as the optical sensor placement will closely match the user's eye separation. This reduces the need to do expensive parallax correction.

At 550, method 500 includes, responsive to the difference between the IPD and the baseline distance being greater than the first threshold, reprojecting the image data based on the IPD prior to displaying the image data on the head-mounted display. This provides parallax correction for users outside a first range of distribution based on the population mean IPD.

Reprojection techniques, such as depth-based reprojection, may thus be used to optimize disparities for users outside of this nominal range, thereby providing automatic correction for people at the tails of the distribution. In brief, a reprojection operation refers to any image processing method that alters captured image data so that it appears as though the image data was captured by a camera that was placed in a different position. In these examples, the images are reprojected so as to appear to be captured by the pupil of the user, and/or by cameras having a baseline distance that is approximately equal to the IPD of the user. Depth-based reprojection may be based on a fixed plane located at a given distance from the user's pupils (and/or the near-eye displays) such that objects positioned at the same distance as the fixed plane are rendered with no depth distortion.

As described further herein, any reprojection plane location may be positioned to reduce relative disparity error over the visible range. The reprojection may be primarily directed towards fixing the X offset between the stereo camera pair and the user's pupils, not necessarily correcting for the parallax problem (cameras are above or below user's eyes (Y offset), or in front/behind (Z offset)). As such a full reprojection of the image data may not be necessary. However, in some examples, the method may further include adjusting the image data based on Y and Z offsets between pupils of the user and the stereo pair of outward-facing cameras based on the received IPD prior to displaying the image data on the head-mounted display.

In some examples, the baseline distance between the stereo pair of outward-facing cameras may be adjustable to more closely match the user's IPD. In such examples, method 500 may include, at 560, adjusting the baseline distance of the stereo pair of outward-facing cameras based on the IPD of the user. At 570, method 500 may include processing the image data based on the difference between the user's IPD and the adjusted baseline prior to displaying the image data on the head-mounted display. In some examples, adjusting the baseline distance of the stereo pair of outward-facing cameras may be performed responsive to the difference between the IPD and the baseline distance being greater than a second threshold, greater than the first threshold, In some examples, adjusting the baseline distance of the stereo pair of outward-facing cameras may be performed following the comparison of the IPD of the user to an initial baseline distance of the stereo pair of outward-facing cameras.

As an example, the stereo pair of outward-facing cameras may be coupled to a translational control stage, translational control motor, linear actuator, belt-driven adjustment mechanism, or other motorized mechanism that, when actuated, causes the right and left cameras to move closer together or further away based on a prescribed baseline distance. For example, the stereo pair of outward-facing cameras may be movable along the X-axis over either a continuous distance, or at predetermined, discreet baseline distances.

As an example, the stereo-pair of outward-facing cameras may be positionable at baseline distances of 58 mm, 64 mm, and 70 mm. A user having an IPD of 64 mm would receive image data as a simple stereo passthrough. Users having IPDs of 62 mm or 66 mm would receive image data that has been reprojected based on their IPD. Users having IPDs of 59 mm or 69 mm would have the stereo pair of outward-facing cameras physically moved to a different baseline distance. The image data may then either be passed through or reprojected based on the user's IPD relative to the updated baseline distance. In this way, the lowest-latency data path possible may be used for streaming image data to the display with the depth perception for the environment. In other embodiments, the HMD system may be fabricated with a fixed camera separation of either 58 mm, 64 mm, and 70 mm, for example, and the user is able to select the HMD configuration that best matches the user's IPD.

In some examples, the user may have the option of choosing between viewing a straight stereo passthrough and the reprojected image. For example, the head-mounted display may allow for manual override option via physical input (e.g., button) or via a NUI command. In other examples, the head-mounted display may recognize user actions that are suggestive of depth perception misalignment, such as reaching for an object at an incorrect distance. Accordingly, method 500 may optionally include, during a condition wherein the difference between the IPD and the baseline distance is greater than the first threshold, responsive to input from the user, pass through the image data to the head-mounted display without correcting for the IPD.

Figure 6A:
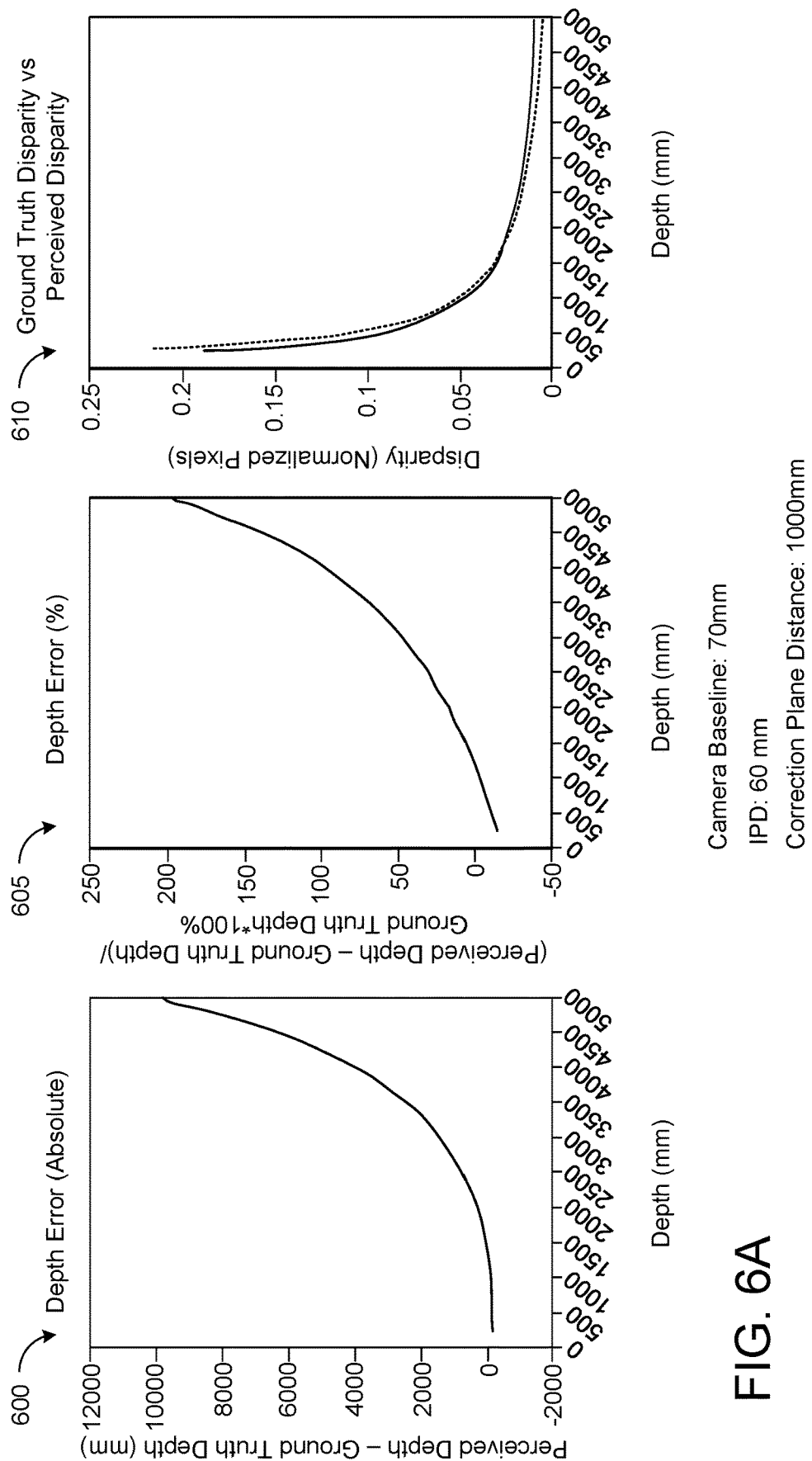
FIG. 6A shows plots indicating depth disparity for reprojection planes having distances of 1 m.
Figure 6B:
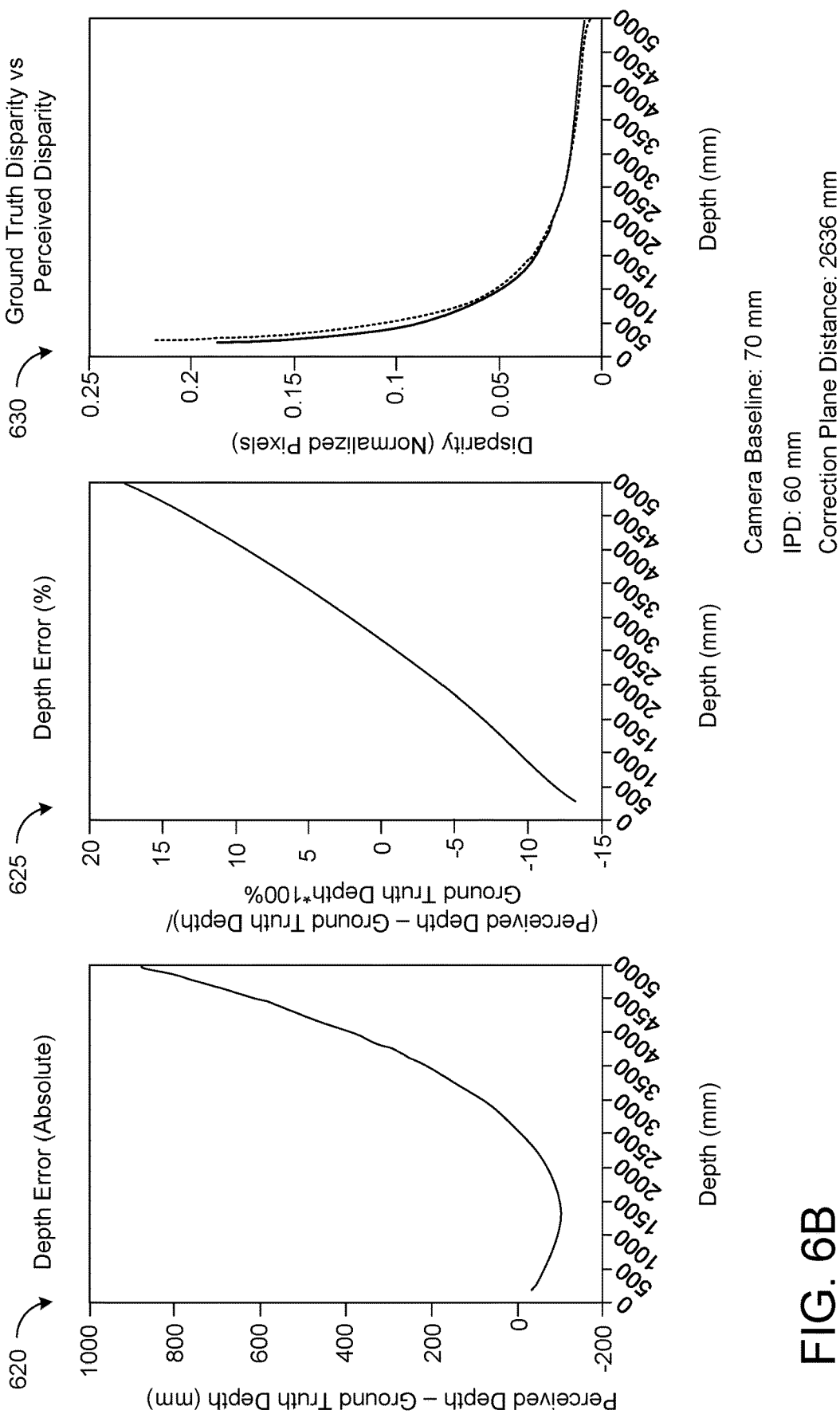
FIG. 6B shows plots indicating depth disparity for reprojection planes having distances of 2.6 m.
Figure 6C:
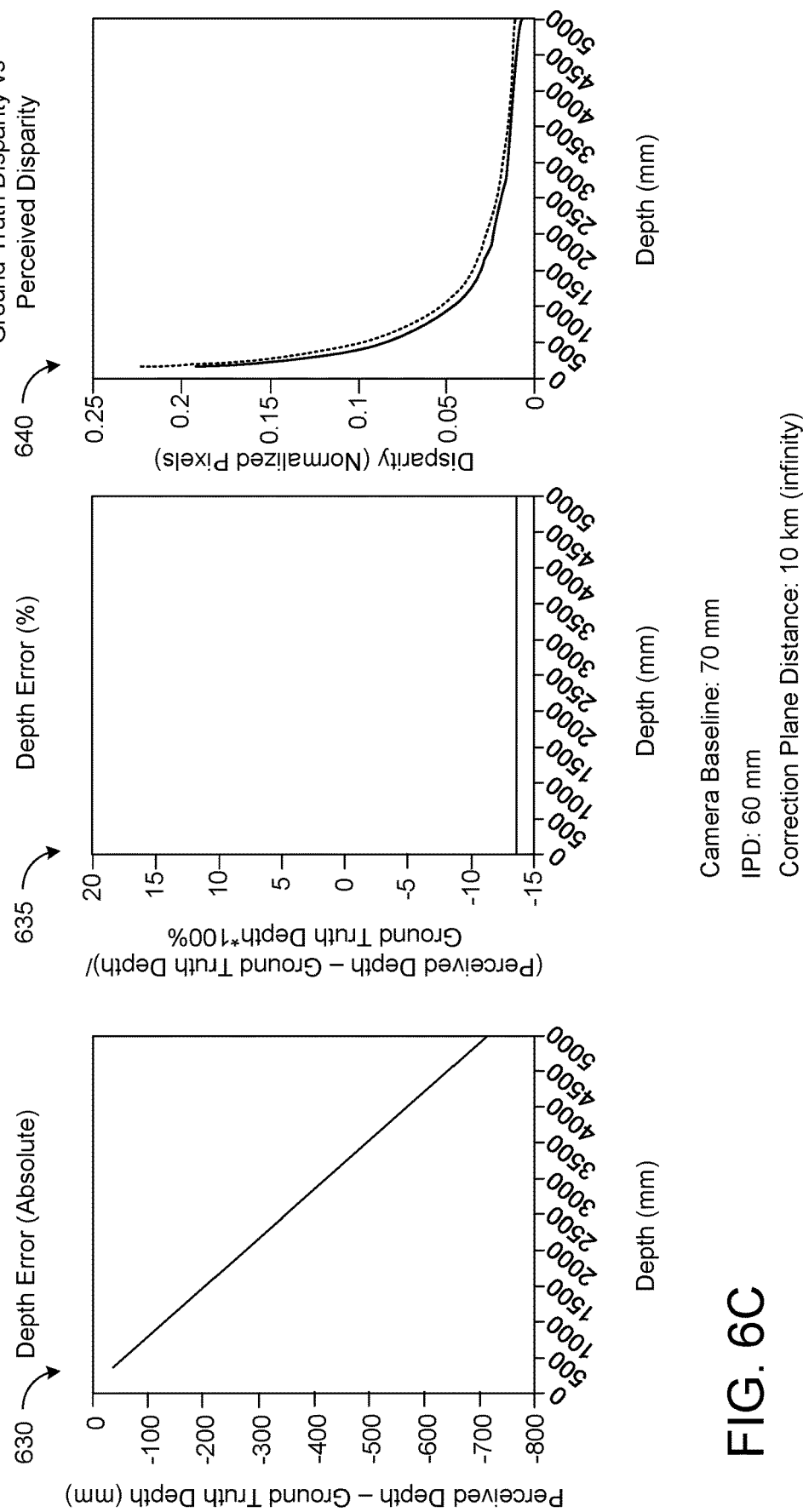
FIG. 6C shows plots indicating depth disparity for reprojection planes having distances of 10 km.

FIGS. 6A, 6B, and 6C show plots indicating depth disparity for reprojection planes having distances of 1 m, 2.6 m, and 10 km (infinite), respectively. In each of these examples, the baseline distance between cameras was set at 70 mm, and the IPD for the user was set at 60 mm. FIG. 6A shows plot 600, indicating absolute depth error at 1 m, plot 605, indicating percent depth error at 1 m, and plot 610, indicating ground truth disparity vs perceived disparity at 1 m. FIG. 6B shows plot 620, indicating absolute depth error at 2.6 m, plot 625, indicating percent depth error at 2.6 m, and plot 630, indicating ground truth disparity vs perceived disparity at 2.6 m. FIG. 6C shows plot 640, indicating absolute depth error at 10 km (infinity), plot 645, indicating percent depth error at 10 km, and plot 650, indicating ground truth disparity vs perceived disparity at 10 km. It will be appreciated that these reprojection planes do not need to be orthogonal to the display, and may be tilted to an arbitrary angle and/or placed at an arbitrary position with respect to the user.

Each plot indicates disparity across distances from 0 to 5 m. Referring to the percent depth error plots (605, 625, and 645) (plotted as perceived depth-real depth), it can be seen that there is no depth error at the distance of the reprojection plane, negative depth error for distances closer than the reprojection plane, and positive depth error for distances further than the reprojection plane. When the depth plane is placed at infinity, depth error exceeds −14% for all depths (plot 645).

A number of reprojection plane depths were simulated in an effort to reduce error over all depths. Referring to plot 625, at 2.6 m there is no depth error. As for other plane depths, for closer distances there is a negative depth error (perceived depth<real depth), and for further distances there is a positive depth error (perceived depth>real depth). However for 2.6 m plane depth, the total/average depth error approaches 0. As such, using a single reprojection plane reduces parallax for users with an IPD within a threshold of a user population.

Figure 7:
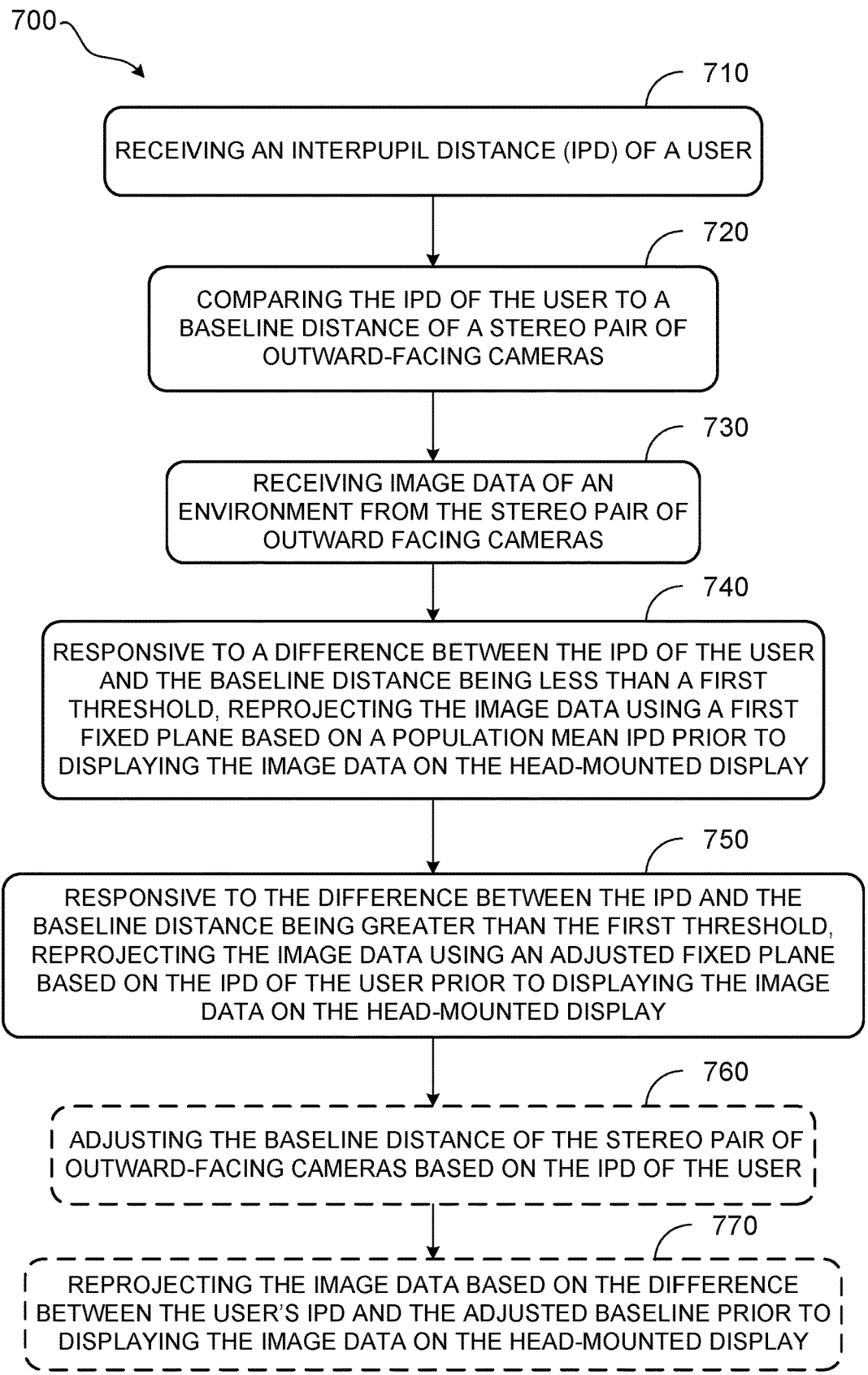
FIG. 7 shows an example method for reprojecting image data based on an inter-pupil distance of a user.

FIG. 7 shows a flow-chart for an example method 700 for reprojecting image data based on an inter-pupil distance of a user. Method 700 may be implemented by a computing system including a head-mounted display, such as computing system 200 described with regard to FIG. 2. Such a head-mounted display may include at least a stereo pair of outward-facing cameras separated by a baseline distance and positioned at a forehead or cheekbones of a user when the head-mounted display is being worn by the user. The head-mounted display may further include at least a controller configured to execute method 700.

Although method 700 will predominantly be described with regard to the user IPD distribution shown in FIG. 4 (e.g., mean IPD of 64 mm) any suitable IPD distribution and baseline distance between stereo cameras may be used without departing from this disclosure.

At 710, method 700 includes receiving an interpupil distance (IPD) of the user. Receiving an IPD of a user may occur passively, such as by accessing a database of user preferences. In some examples, receiving an IPD of a user may include actively measuring a user's IPD using inward-facing, eye-tracking cameras. For example, the head-mounted display may include one or more inward-facing cameras, such as inward-facing cameras 224 shown in FIG. 2. Image data may be received from the one or more inward-facing cameras, and the IPD of the user determined based on the received image data.

At 720, method 700 includes comparing the IPD to the baseline distance of the stereo pair of outward-facing cameras. For example, the baseline distance may be a fixed distance, and/or a distance determinable via the controller. In some examples, the baseline distance between the stereo pair of outward-facing cameras is based on a mean IPD determined from a user population. Comparing the IPD to the baseline distance may include determining a difference between the two distances, and may further include comparing the difference to one or more thresholds based on the baseline distance. The thresholds may further be based on the IPD distribution of the user population and/or one or more physiological factors.

At 730, method 700 includes receiving image data of an environment from the stereo pair of outward-facing cameras. For example, the stereo pair of outward-facing cameras may record left and right perspective views of the environment at a predetermined frame rate. As described with regard to FIG. 2, the stereo pair of outward-facing cameras may each include one or cameras configured to image the environment at a predetermined range of frequencies.

At 740, method 700 includes, responsive to a difference between the IPD and the baseline distance being less than a first threshold, reprojecting the image data using a first fixed plane based on a population mean IPD prior to displaying the image data on the head-mounted display. The first fixed plane may be set at a predetermined distance from the head-mounted display, the predetermined distance based on the user IPD and the baseline distance of the stereo pair of outward-facing cameras. The first fixed plane position may be selected based on a distance that reduces reprojection error for the user population mean IPD, e.g., 2.6 m, as described with regard to FIG. 6B. In some examples, the first fixed plane position is not based on depth information derived from image data of the environment, thus negating the necessity of doing a full depth reconstruction in favor of a simpler, faster, and less computationally expensive reprojection. The first fixed plane position may be body-locked to the head-mounted display, such that the reprojection plane remains at the first fixed plane position regardless of movement and/or orientation of the user.

At 750, method 700 includes, responsive to the difference between the IPD and the baseline distance being greater than the first threshold, reprojecting the image data using an adjusted fixed plane based on the IPD of the user prior to displaying the image data on the head-mounted display.

For example, the adjusted fixed plane position may be selected based on a distance that reduces reprojection error for the IPD of the user, and may be further based on the baseline distance of the stereo pair of outward-facing cameras.

Figure 8:
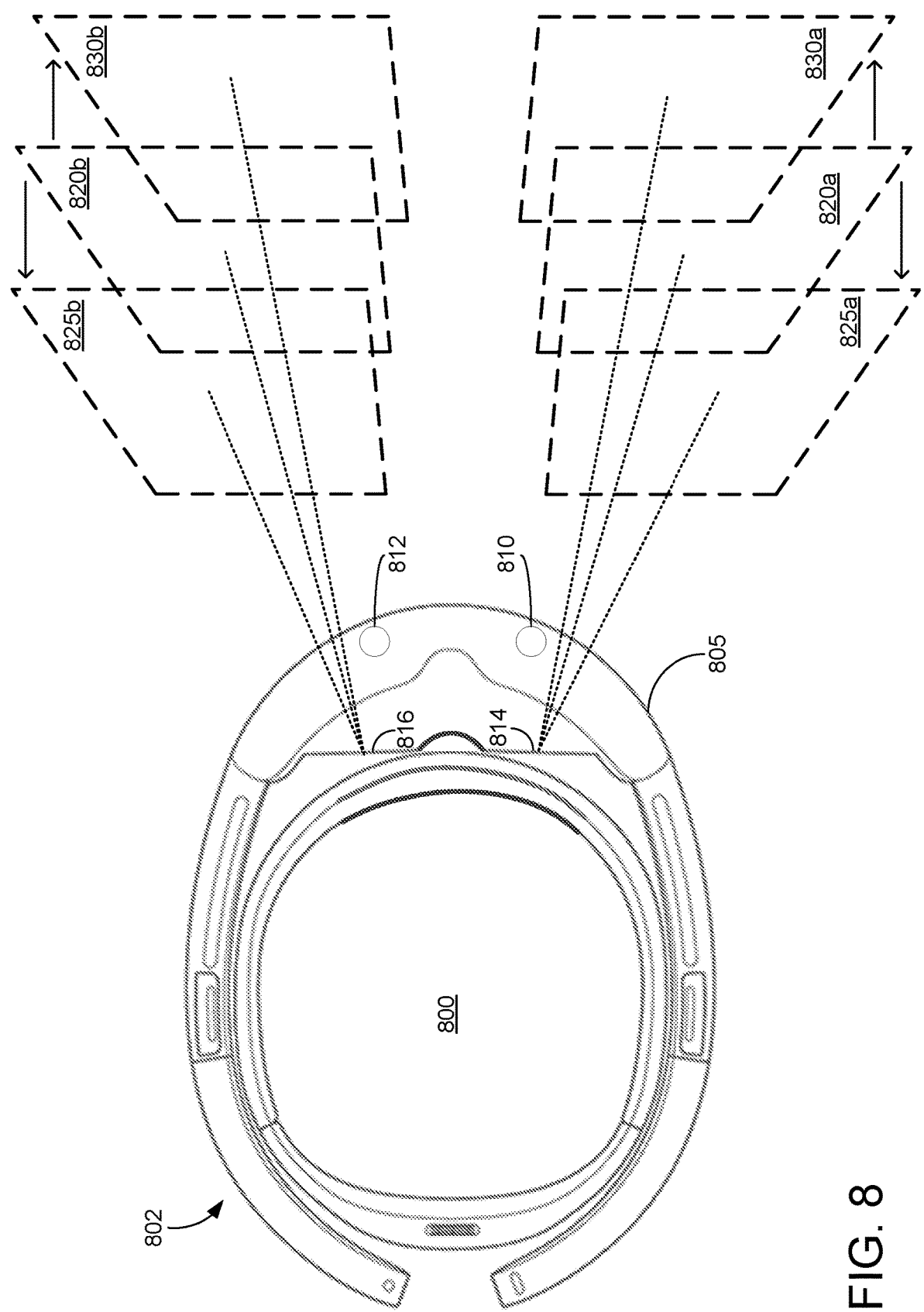
FIG. 8 shows examples of reprojection planes that may be selected based on an inter-pupil distance of a user.

FIG. 8 depicts a user 800 wearing a computing device 802 that includes a head-mounted display 805. Head-mounted display 802 includes at least left and right outward-facing cameras (810, 812) and left and right near-eye displays (814, 816). In this example, the reprojection planes are depicted as having left and right components, though in other configurations a single fixed plane (flat or curved) may be used. In this example fixed planes 820a and 820b represent the first, or default fixed plane that may be used for a user having an IPD within a threshold of the baseline distance between cameras 810 and 812.

In some examples, the adjusted fixed plane position includes a change in distance to the head-mounted display relative to the first fixed plane. For example, the fixed plane may be moved closer to near eye displays 814 and 816 (e.g., fixed planes 825a and 825b) or further from near eye displays 814 and 816 (e.g., fixed planes 830a and 830b). The position of the fixed plane may be independent of the environmental geometry, so that full 3D reconstruction is not needed. The position of the fixed plane may thus be derived from any suitable means based on the baseline distance and the user's IPD, such as via a lookup table. In some examples, the reprojection plane may be positioned to account for the Y-offset between the cameras and the user's pupils. Some users have slight Y-offset between their right and left eyes. In such examples, the right and left fixed planes may be independently positioned.

If a user was mainly interacting with close or far objects, the fixed plane position may be adjusted based on user input and/or cues derived from the image data. For example, if the user is working in close range, the fixed plane could be adjusted to reduce error over a range of 250 mm to 1 m (rather than 250 mm to 5 m or 2.5 m to 10 m). Similarly, pilots or other users viewing objects at greater distances may have their fixed planes adjusted accordingly. In some examples, infinite depth may be selected (see FIG. 6C).

In some examples, some depth data may be extracted from the image data to identify depths of interesting features (e.g., corners). As an example, a set of 30 feature points may be extracted from the whole image, the depth distribution for these points determined, and then stereo reprojection adjusted based on this sparse reconstruction.

In some examples, the adjusted fixed plane position may additionally or alternatively include a change in orientation to the head-mounted display relative to the first fixed plane, such as a change in tilt or change in curvature. For example, the orientation could be adjusted based on how the environmental geometry is laid out or inferred to be laid out.

Returning to FIG. 7, at 760, method 700 optionally includes, adjusting the baseline distance of the stereo pair of outward-facing cameras based on the IPD of the user. As described with regard to FIG. 5, adjust the baseline distance of the stereo pair of outward-facing cameras may include physically moving the stereo pair of outward-facing cameras to positions chosen to more closely match the baseline distance to the user's IPD. The positioning of fixed planes may be adjusted based on the adjusted baseline distance and the user's IPD.

At 770, method 700 may include reprojecting the image data based on the difference between the user's IPD and the adjusted baseline prior to displaying the image data on the head-mounted display. In some examples, adjusting the baseline distance of the stereo pair of outward-facing cameras may be performed responsive to the difference between the IPD and the baseline distance being greater than a second threshold, greater than the first threshold, In some examples, adjusting the baseline distance of the stereo pair of outward-facing cameras may be performed following the comparison of the IPD of the user to an initial baseline distance of the stereo pair of outward-facing cameras. In some examples, reprojecting the image data may be based on a difference between the IPD of the user and the adjusted baseline distance using an adjusted fixed plane at a distance that reduces reprojection error for the IPD of the user prior to displaying the image data on the head-mounted display.

In some embodiments, the methods and processes described herein may be tied to a computing system of one or more computing devices. In particular, such methods and processes may be implemented as a computer-application program or service, an application-programming interface (API), a library, and/or other computer-program product. Such methods may be enacted in part by one or more computing systems and computing devices that are remote from other device hardware, including cloud computing devices and/or servers configured to receive, process, and/or transmit data related to the described methods and processes.

FIG. 9 schematically shows a non-limiting embodiment of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices.

Computing system 900 includes a logic machine 910 and a storage machine 920. Computing system 900 may optionally include a display subsystem 930, input subsystem 940, communication subsystem 950, and/or other components not shown in FIG. 9.

Logic machine 910 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 920 includes one or more physical devices configured to hold instructions executable by the logic machine to implement the methods and processes described herein. When such methods and processes are implemented, the state of storage machine 920 may be transformed—e.g., to hold different data.

Storage machine 920 may include removable and/or built-in devices. Storage machine 920 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 920 may include volatile, nonvolatile, dynamic, static, read/write, read-only, random-access, sequential-access, location-addressable, file-addressable, and/or content-addressable devices.

It will be appreciated that storage machine 920 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 910 and storage machine 920 may be integrated together into one or more hardware-logic components. Such hardware-logic components may include field-programmable gate arrays (FPGAs), program- and application-specific integrated circuits (PASIC/ASICs), pro-gram- and application-specific standard products (PSSP/ASSPs), system-on-a-chip (SOC), and complex programmable logic devices (CPLDs), for example.

The terms "module," "program," and "engine" may be used to describe an aspect of computing system 900 implemented to perform a particular function. In some cases, a module, program, or engine may be instantiated via logic machine 910 executing instructions held by storage machine 920. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 930 may be used to present a visual representation of data held by storage machine 920. This visual representation may take the form of a graphical user interface (GUI). As the herein described methods and processes change the data held by the storage machine, and thus transform the state of the storage machine, the state of display subsystem 930 may likewise be transformed to visually represent changes in the underlying data. Display subsystem 930 may include one or more display devices utilizing virtually any type of technology. Such display devices may be combined with logic machine 910 and/or storage machine 920 in a shared enclosure, or such display devices may be peripheral display devices.

When included, input subsystem 940 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 950 may be configured to communicatively couple computing system 900 with one or more other computing devices. Communication subsystem 950 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

In one example head-mounted display comprises a stereo pair of outward-facing cameras separated by a baseline distance when the head-mounted display is being worn by the user; and a controller configured to receive an interpupil distance (IPD) of the user; compare the IPD to the baseline distance of the stereo pair of outward-facing cameras; receive image data of an environment from the stereo pair of outward-facing cameras; responsive to a difference between the IPD and the baseline distance being less than a first threshold, pass through the image data to the head-mounted display without correcting for the IPD; and responsive to the difference between the IPD and the baseline distance being greater than the first threshold, reproject the image data based on the IPD prior to displaying the image data on the head-mounted display. In such an example, or any other example, the head-mounted display additionally or alternatively comprises one or more inward-facing cameras, and wherein receiving an IPD of the user includes receiving image data from the one or more inward-facing cameras; and determining the IPD of the user based on the received image data. In any of the preceding examples, or any other example, the controller is additionally or alternatively configured to adjust the image data based on Y and Z offsets between pupils of the user and the stereo pair of outward-facing cameras based on the received IPD prior to displaying the image data on the head-mounted display. In any of the preceding examples, or any other example, the baseline distance between the stereo pair of outward-facing cameras is additionally or alternatively based on a mean IPD determined from a user population. In any of the preceding examples, or any other example, the baseline distance between the stereo pair of outward-facing cameras is additionally or alternatively adjustable, and the controller is additionally or alternatively configured to adjust the baseline distance of the stereo pair of outward-facing cameras based on the IPD of the user; and process the image data based on a difference between the IPD of the user and the adjusted baseline distance prior to displaying the image data on the head-mounted display. In any of the preceding examples, or any other example, the baseline distance of the stereo pair of outward-facing cameras is additionally or alternatively adjusted responsive to the difference between the IPD and the baseline distance being greater than a second threshold, greater than the first threshold. In any of the preceding examples, or any other example, the controller is additionally or alternatively configured to, during a condition wherein the difference between the IPD and the baseline distance is greater than the first threshold, responsive to input from the user, pass through the image data to the head-mounted display without correcting for the IPD.

In another example, a head-mounted display, comprises a stereo pair of outward-facing cameras separated by a baseline distance when the head-mounted display is being worn by the user; and a controller configured to: receive an interpupil distance (IPD) of the user; compare the IPD of the user to the baseline distance of the stereo pair of outward-facing cameras; receive image data of an environment from the stereo pair of outward-facing cameras; responsive to a difference between the IPD of the user and the baseline distance being less than a first threshold, reproject the image data using a first fixed plane based on a user population mean IPD prior to displaying the image data on the head-mounted display; and responsive to the difference between the IPD and the baseline distance being greater than the first threshold, reproject the image data using an adjusted fixed plane based on the IPD of the user prior to displaying the image data on the head-mounted display. In such an example, or any other example, the first fixed plane position is additionally or alternatively selected based on a distance that reduces reprojection error for the user population mean IPD. In any of the preceding examples, or any other example, the adjusted fixed plane position is additionally or alternatively selected based on a distance that reduces reprojection error for the IPD of the user. In any of the preceding examples, or any other example, the adjusted fixed plane position additionally or alternatively includes a change in distance to the head-mounted display relative to the first fixed plane. In any of the preceding examples, or any other example, the adjusted fixed plane position additionally or alternatively includes a change in orientation to the head-mounted display relative to the first fixed plane. In any of the preceding examples, or any other example, the baseline distance between the stereo pair of outward-facing cameras is additionally or alternatively adjustable, and the controller is additionally or alternatively configured to: adjust the baseline distance of the stereo pair of outward-facing cameras based on the IPD of the user; and reproject the image data using an adjusted fixed plane based on a difference between the IPD of the user and the adjusted baseline distance prior to displaying the image data on the head-mounted display. In any of the preceding examples, or any other example, the baseline distance of the stereo pair of outward-facing cameras is additionally or alternatively adjusted responsive to the difference between the IPD and the baseline distance being greater than a second threshold, greater than the first threshold.

In yet another example, a method for a head-mounted display comprises receiving an interpupil distance (IPD) of a user wearing the head-mounted display; comparing the IPD of the user to a baseline distance of a stereo pair of outward-facing cameras included in the head-mounted display; receiving image data of an environment from the stereo pair of outward-facing cameras; responsive to a difference between the IPD of the user and the baseline distance being less than a first threshold, reprojecting the image data using a first fixed plane at a distance that reduces reprojection error for a mean IPD of a user population prior to displaying the image data on the head-mounted display; and responsive to the difference between the IPD and the baseline distance being greater than the first threshold, reprojecting the image data using an adjusted fixed plane at a distance that reduces reprojection error for the IPD of the user prior to displaying the image data on the head-mounted display. In such an example, or any other example, the adjusted fixed plane position additionally or alternatively includes a change in distance to the head-mounted display relative to the first fixed plane. In any of the preceding examples, or any other example, the adjusted fixed plane position additionally or alternatively includes a change in orientation to the head-mounted display relative to the first fixed plane. In any of the preceding examples, or any other example, the baseline distance between the stereo pair of outward-facing cameras is additionally or alternatively adjustable, and the method additionally or alternatively comprises adjusting the baseline distance of the stereo pair of outward-facing cameras based on the IPD of the user; and reprojecting the image data based on a difference between the IPD of the user and the adjusted baseline distance using an adjusted fixed plane at a distance that reduces reprojection error for the IPD of the user prior to displaying the image data on the head-mounted display. In any of the preceding examples, or any other example, the baseline distance of the stereo pair of outward-facing cameras is additionally or alternatively adjusted responsive to the difference between the IPD and the baseline distance being greater than a second threshold, greater than the first threshold. In any of the preceding examples, or any other example, the method additionally or alternatively comprises adjusting the image data based on Y and Z offsets between pupils of the user and the stereo pair of outward-facing cameras based on the received IPD prior to displaying the image data on the head-mounted display.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A head-mounted display, comprising:
   a stereo pair of outward-facing cameras separated by a baseline distance when the head-mounted display is being worn by the user; and
   a controller configured to:
      receive an interpupil distance (IPD) of the user;
      compare the IPD to the baseline distance of the stereo pair of outward-facing cameras;
      receive image data of an environment from the stereo pair of outward-facing cameras;
      responsive to a difference between the IPD and the baseline distance being less than a first threshold, pass through the image data to the head-mounted display without correcting for the IPD; and
      responsive to the difference between the IPD and the baseline distance being greater than the first threshold, reproject the image data based on the IPD prior to displaying the image data on the head-mounted display.

2. The head-mounted display of claim 1, further comprising:
   one or more inward-facing cameras, and wherein receiving an IPD of the user includes receiving image data from the one or more inward-facing cameras; and
   determining the IPD of the user based on the received image data.

3. The head-mounted display of claim 1, wherein the controller is further configured to adjust the image data based on Y and Z offsets between pupils of the user and the stereo pair of outward-facing cameras based on the received IPD prior to displaying the image data on the head-mounted display.

4. The head-mounted display of claim 1, wherein the baseline distance between the stereo pair of outward-facing cameras is based on a mean IPD determined from a user population.

5. The head-mounted display of claim 1, wherein the baseline distance between the stereo pair of outward-facing cameras is adjustable, and wherein the controller is further configured to:
   adjust the baseline distance of the stereo pair of outward-facing cameras based on the IPD of the user; and
   reproject the image data using an adjusted fixed plane based on a difference between the IPD of the user and the adjusted baseline distance prior to displaying the image data on the head-mounted display.

6. The head-mounted display of claim 1, wherein the baseline distance of the stereo pair of outward-facing cameras is adjusted responsive to the difference between the IPD and the baseline distance being greater than a second threshold, greater than the first threshold.

7. The head-mounted display of claim 1, wherein the controller is further configured to:
   during a condition wherein the difference between the IPD and the baseline distance is greater than the first threshold,
   responsive to input from the user, pass through the image data to the see-through display without correcting for the IPD.

8. A head-mounted display, comprising:
   a stereo pair of outward-facing cameras separated by a baseline distance when the head-mounted display is being worn by the user; and
   a controller configured to:
      receive an interpupil distance (IPD) of the user;
      compare the IPD of the user to the baseline distance of the stereo pair of outward-facing cameras;
      receive image data of an environment from the stereo pair of outward-facing cameras;
      responsive to a difference between the IPD of the user and the baseline distance being less than a first threshold, reproject the image data using a first fixed plane based on a user population mean IPD prior to displaying the image data on the head-mounted display; and
      responsive to the difference between the IPD and the baseline distance being greater than the first threshold, reproject the image data using an adjusted fixed plane based on the IPD of the user prior to displaying the image data on the head-mounted display.

9. The head-mounted display of claim 8, wherein the first fixed plane position is selected based on a distance that reduces reprojection error for the user population mean IPD.

10. The head-mounted display of claim 8, wherein the adjusted fixed plane position is selected based on a distance that reduces reprojection error for the IPD of the user.

11. The head-mounted display of claim 8, wherein the adjusted fixed plane position includes a change in distance to the head-mounted display relative to the first fixed plane.

12. The head-mounted display of claim 8, wherein the adjusted fixed plane position includes a change in orientation to the head-mounted display relative to the first fixed plane.

13. The head-mounted display of claim 8, wherein the baseline distance between the stereo pair of outward-facing cameras is adjustable, and wherein the controller is further configured to:
 adjust the baseline distance of the stereo pair of outward-facing cameras based on the IPD of the user; and
 reproject the image data using an adjusted fixed plane based on a difference between the IPD of the user and the adjusted baseline distance prior to displaying the image data on the head-mounted display.

14. The head-mounted display of claim 13, wherein the baseline distance of the stereo pair of outward-facing cameras is adjusted responsive to the difference between the IPD and the baseline distance being greater than a second threshold, greater than the first threshold.

15. A method for a head-mounted display, comprising:
 receiving an interpupil distance (IPD) of a user wearing the head-mounted display;
 comparing the IPD of the user to a baseline distance of a stereo pair of outward-facing cameras included in the head-mounted display;
 receiving image data of an environment from the stereo pair of outward-facing cameras;
 responsive to a difference between the IPD of the user and the baseline distance being less than a first threshold, reprojecting the image data using a first fixed plane at a distance that reduces reprojection error for a mean IPD of a user population prior to displaying the image data on the head-mounted display; and
 responsive to the difference between the IPD and the baseline distance being greater than the first threshold, reprojecting the image data using an adjusted fixed plane at a distance that reduces reprojection error for the IPD of the user prior to displaying the image data on the head-mounted display.

16. The method of claim 15, wherein the adjusted fixed plane position includes a change in distance to the head-mounted display relative to the first fixed plane.

17. The method of claim 15, wherein the adjusted fixed plane position includes a change in orientation to the head-mounted display relative to the first fixed plane.

18. The method of claim 15, wherein the baseline distance between the stereo pair of outward-facing cameras is adjustable, and wherein the method further comprises:
 adjusting the baseline distance of the stereo pair of outward-facing cameras based on the IPD of the user; and
 reprojecting the image data based on a difference between the IPD of the user and the adjusted baseline distance using an adjusted fixed plane at a distance that reduces reprojection error for the IPD of the user prior to displaying the image data on the head-mounted display.

19. The method of claim 18, wherein the baseline distance of the stereo pair of outward-facing cameras is adjusted responsive to the difference between the IPD and the baseline distance being greater than a second threshold, greater than the first threshold.

20. The method of claim 15, further comprising:
 adjusting the image data based on Y and Z offsets between pupils of the user and the stereo pair of outward-facing cameras based on the received IPD prior to displaying the image data on the head-mounted display.

\* \* \* \* \*